Figure 1:
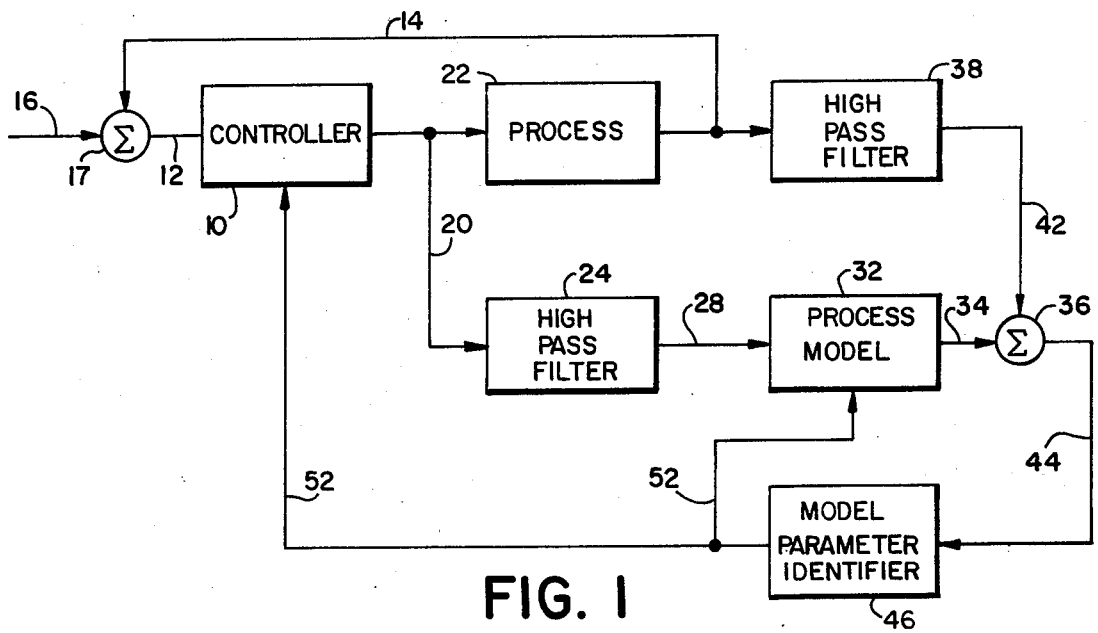

United States Patent [19]

Arcara

[11] 4,385,362
[45] May 24, 1983

[54] FILTER ARRANGEMENT FOR ELIMINATION OF UNWANTED BIAS IN A MODEL REFERENCE PROCESS CONTROL SYSTEM

[75] Inventor: Samuel A. Arcara, Telford, Pa.

[73] Assignee: Leeds & Northrup Company, North Wales, Pa.

[21] Appl. No.: 198,844

[22] Filed: Oct. 20, 1980

[51] Int. Cl.³ ............................................. G05B 13/02
[52] U.S. Cl. .................................... 364/572; 364/151; 364/162
[58] Field of Search ............... 364/150, 151, 152, 157, 364/159, 162, 164, 571, 572

[56] References Cited

U.S. PATENT DOCUMENTS

| | | | |
|---|---|---|---|
| 3,030,054 | 4/1962 | Lee et al. | 364/149 X |
| 3,109,970 | 11/1963 | Smyth | 364/149 X |
| 3,221,230 | 11/1965 | Osburn | 364/150 X |
| 3,287,615 | 11/1966 | Smyth | 364/149 X |
| 3,446,946 | 5/1969 | Andeen | 364/149 |
| 3,648,031 | 3/1972 | Neal | 364/572 |
| 3,795,799 | 3/1974 | Courtiol | 364/150 |
| 4,038,531 | 7/1977 | Loe, Jr. | 364/150 X |
| 4,054,780 | 10/1977 | Bartley et al. | 526/59 X |
| 4,214,300 | 7/1980 | Barlow et al. | 318/561 X |

OTHER PUBLICATIONS

Designing and Tuning Digital Controllers, E. B. Dahlin, Instruments & Control Systems, vol. 42, No. 6, Jun. 1968, pp. 77-83.
Adaptive Control Through Instrumental-Variable Estimation of Discrete Model Parameters, A. B. Corripio, ISA, 1977, ISBN 87664-363-2, pp. 57-63.

*Primary Examiner*—Edward J. Wise
*Attorney, Agent, or Firm*—Stuart E. Beck

[57] ABSTRACT

Unwanted bias is eliminated from a process control system by high pass filters which are disposed between the process and the process model.

9 Claims, 3 Drawing Figures

FILTER ARRANGEMENT FOR ELIMINATION OF UNWANTED BIAS IN A MODEL REFERENCE PROCESS CONTROL SYSTEM

This invention relates to a system for controlling a process and more particularly to a system for controlling a process in which offsets or biases which do not have corresponding inputs to the system can be eliminated.

Automatic control systems for processes are used to monitor and control process variables such as temperatures, pressures, viscosities and the like that are developed in the process. Since it is difficult to develop a means for determining how the process variable actually responding to inputs to the process, a model of the process is used. The process model can be made to correspond to the state of the actual process at any time, and to the extent that information developed in the process model indicates that there is a difference between the state of the process model, the state of the process variable, and the desired state of the process variable (the set point) a signal which corresponds to difference between the process model, the state of the process is developed. This is applied to the process model to bring the model into agreement with the process variable.

The information contained in the process model is then used to adjust the controller's parameters to provide the proper controller action required to bring the process to the set point.

Thus, if it is desired to bring a material to a particular temperature, the process model may detect that the controller's parameters are not properly adjusted for the process, and thereby import information to the controller to modify its parameters enabling the proper controller output action to apply the correct amount of heat required to bring the material to the set point temperature.

Desirably, each state of the process which is detected by the process model should correspond to an input to the process.

However, it is often the case that there are output from a process even though there are no inputs.

A typical case might be where it is desired to heat a liquid. Such a circumstance, even though there is "zero" input to the process, the liquid may not be at "zero degrees". Rather, it is likely that it would be at the ambient air temperature.

Therefore, the process model will get the same "zero" input as the process receives so that it gives a "zero" output. If no adjustment is made, an error would appear in the control system whose size would be the difference between the model output, i.e., "zero" and the ambient temperature to the extent that the model will not be able to accurately reflect the state of the process.

Consequently, it has been necessary to introduce a mechanism that deal's with offsets that existed in the process at the time that it was initiated. Typically, these have included the inclusion of two bias references.

The bias references were disposed on either side of the process model. A signal corresponding to the state of the process variable when there is no input applied to it is being applied to the model through a summer. A signal corresponding to the state of the process variable at any given time is applied through a summer to the output signal from the process model so that the initial offset is removed from the error signal appearing as a result of the difference between the output signal from the process model and the signal corresponding to the state of the process.

However, while this mechanism is suitable for dealing with offsets that exist at the beginning of the process it is unable to deal with offsets that occured after the process had begun. A typical example of such a problem might be the gradual warming of the ambient air during the day while the process is underway.

This is a grave disadvantage to the successful automatic control of the system since the control parameters on which the automatic operating of the process is based cannot be accurately controlled. Thus, the process controller cannot be adjusted to supply the proper degree of control to the process which is underway.

Generally, the invention described herein deals with this problem by providing a control system in which the offsets are removed from the output signals from the controller and from the signal corresponding the state of process by identical high pass filters. The filtered output of the controller is then applied to the process model. The output signal from the process model and the filtered signal corresponding to the state of the process are combined to create an error signal which is free from the offsets and which can be used to vary the process model.

Figure 2:
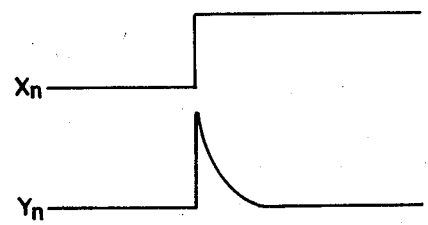

The invention can best be described by referring to the accompanying drawing wherein the like numerals identify like elements throughout the several views and wherein FIG. 1 is a process control system of the type disclosed herein, and FIG. 2 shows the response curve of the high pass filters.

Figure 3:
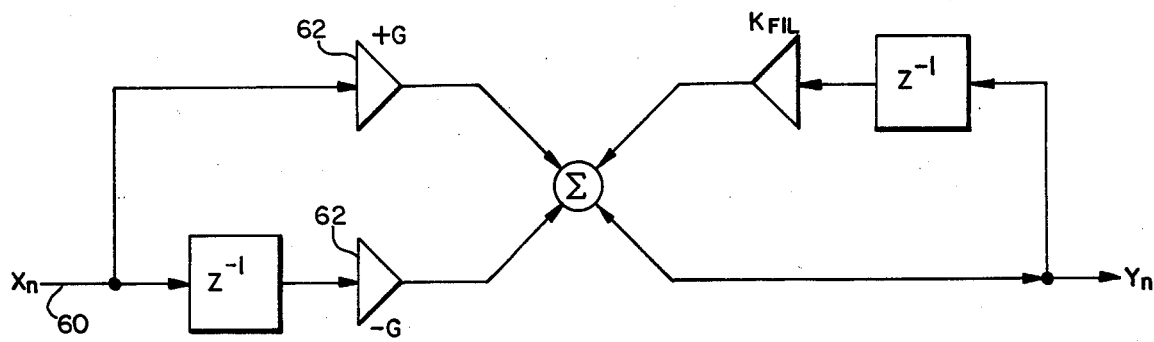

FIG. 3 shows an embodiment of a filter having the response curve of FIG. 2.

Referring to FIG. 1 a process control system using a controller of the P-I-D type is shown. P-I-D control systems using controllers, and variable process models are well known in the art and need not be discussed in detail here. Typical of the literature in this field are Touchstone A. T. and Corripio A. B., *Adaptive Control Through Instrumental - Variable Estimation of Discrete Model Parameters*, Inst. & Cont. Syst., Vol. 42, No. 6, June 1968, pp. 77–83.

The process controller receives an input signal 12 which corresponds to the difference between a signal 16 which corresponds to the set point for the process variable that is being controlled and a signal 14 which corresponds to the state of the process at a given time. Signals 14 and 16 are summed in summer 17 and the summed signal 12 is applied is the input signal 12 to the controller 10.

The output signal of the controller is applied to control the process 22 and to the high pass filter 24. The filtered output signal 28 is applied to process model 32. The output signal of the process model 34 is applied to a summer 36.

The output signal from the process controller 10 is also applied to the process 22 and a signal 14 which corresponds to the state of the process is applied to a second high pass filter 38 which is identical to filter 24. The output signal 42 from the high pass filter 38 is applied to summer 36.

If signals 34 and 42 are different, the process model does not accurately reflect the process state. Consequently, a model error signal 44 will be produced by summer 36. The model error signal 44 is applied to model parameter identifier 46.

The output signal 52 from the model parameter identifier 46 is applied to the process model and to the controller. Output signal 52 varies the process model and the controller in accordance with the value of error signal 44 as explained in the above mentioned articles.

When the process model output signal 34 is the same value as the filtered signal 42 the error signal will be zero. Therefore, the parameters identified in model parameter identifier 46 can be applied to enable the controller 10 to bring the process to the set point level selected.

The filters are designed so that a step input results in a pulse having a sharp rise which decays to the starting value. The input and response curves are illustrated in FIG. 2.

wherein:
$X_n$=the present input to the filter
$Y_n$=the present output from the filter The gain for the filter can be selected from any convenient number. In a typical situation the magnitude of the gain may be selected to give a change of 1.0 for a change in input of 0.001. This would result in a gain of 1,000.

The filters 24 and 38 may have the form shown in FIG. 3 in which the present filter output is the sum of the present input signal 60 to the filter multiplied by the filter gain 62, the immediately preceeding input signal to the filter is multiplied by the negative filter gain, and filter output immediately preceeding the present output multiplied by the filter constant.

The filter constant may be chosen on an experimental basis. Typically, it can be chosen to correspond to the time that it takes for the filter output to decay to 63% of its stepped output value. Preferably thirty five samples of $Y_n$ can be taken during that time period. The selection of the time constant is a trade-off between making it long enough to detect process changes while being short enough to track reference level changes. The final form of a filter of this design is illustrated in FIG. 3.

G=the gain of the filter
$X_n$=is the present input to the filter
$Y_n$=the present output from the filter
$K_{fil}$=the constant for the filter
$Z^{-1}$=a time delay of one interval.

The general equation of the filter illustrated in FIGS. 2 and 3 is $Y_n = K(Y_{n-1}) + G[X_n - (X_{n-1})]$.

wherein:
$Y_n$=the present output signal from the filter
K=a constant that corresponds to the rate of decay of the filter output signal
$Y_{n-1}$=the output signal from the filter for the interval prior to the present interval
$X_n$=the present input to filter
$X_{n-1}$=the input to the filter for the interval prior to the present interval
G=the gain of the filter It has been found that the use of the high pass filters eliminates signals which result from variations in the offset which occur prior to or during the process.

The fact that both filters 24 and 38 are the same enhance their utilization in controlling the process because of the simplified nature of their application.

While the invention has been described with respect to one particular method and apparatus for accomplishing the same, it is apparent that other methods and other apparatus will be obvious to those skilled in the art in view of the foregoing description. Thus, this scope of the invention should not be limited by the foregoing description, but rather, only by reference to the claims appended hereto.

What is claimed is:

1. In a method for controlling a process in which the process may be subject to offsets that may be present when the process starts or after it is underway and said method is of the type that includes providing a controller, a process model and means for varying the process model, the improvement comprising
    filtering the output signals from said controller and from said process to remove said offsets,
    applying the filtered output signal from said controller to said variable process model,
    comparing the filtered output signal from said process model with the output signal from said process to generate an error signal,
    applying said error signal to said means for varying said process model, and
    applying the output signal from said means for varying said process model to said process model and to said controller so that said output signal from said controller is unaffected by said offsets.

2. The method as defined in claim 1 wherein both of said filters have the same transmission band and their cut offs are above the frequency of the signal generated by said offsets.

3. The method as defined in claim 2 wherein the response curve of said filters are such that in response to a step input the output is a pulse with a sharp rise and decay to its starting value.

4. The method as defined in claim 2 wherein the present output signal from each of the filters has the general form $Y_n = K(Y_{n-1}) + G[X_n - (X_{n-1})]$ in which
    K=a constant that corresponds to the rate of decay of the filter output signal
    $Y_n$=the present output signal from the filter
    $Y_{n-1}$=the output signal from the filter for the interval prior to the present interval
    G=the gain of the filter
    $X_n$=the present input to filter
    $X_{n-1}$=the input to the filter for the interval prior to the present interval 5. In an apparatus for controlling a process which may be subject to offsets that may be present when the process starts or after it is underway and said apparatus is of the type that includes a controller, a process model and means for varying the process model, the improvement comprising
    means for filtering the output signals from said controller and from said process to remove said offsets,
    means for comparing the filtered output signals from said process with the output signal from said process model to create an error signal, and
    said means for varying said process model being responsive to said error signal to generate a process model varying signal to be applied to said controller and to said process model so that output signal from said controller is unaffected by said offsets.

6. An apparatus as defined in claim 5 wherein said means for comparing the filtered output signal from said process with the output signal from said process model comprises a summer.

7. The apparatus as defined in claim 5 wherein both of said filters have the same transmission band and their cut offs are above the frequency of the signal generated by said offsets.

8. The apparatus as defined in claim 7 wherein the response curve of said filters are such that in response to a step input the output is a pulse with a sharp rise and a decay to its starting value.

9. The apparatus as defined in claim 7 wherein the output signal from each of the filters is of the general form $Y_n = K(Y_{n-1}) + G[X_n - (X_{n-1})]$ and K = a constant that corresponds to the rate of decay of the filter output signal
$Y_n$ = the present output signal from the filter
$Y_{n-1}$ = the output signal from the filter for the interval prior to the present interval
G = the gain of the filter
$X_n$ = the present input to filter
$X_{n-1}$ = the input to the filter for the interval prior to the present interval.

* * * * *